(12) United States Patent
Weimer et al.

(10) Patent No.: US 6,409,198 B1
(45) Date of Patent: Jun. 25, 2002

(54) METHOD AND APPARATUS FOR MEASURING ATMOSPHERIC TEMPERATURE

(75) Inventors: Carl Scott Weimer; Stuart Paul Beaton, both of Littleton; Martin Joseph O'Brien, Pine; Loren Dean Nelson, Evergreen, all of CO (US)

(73) Assignee: Ophir Corporation, Littleton, CO (US)

( * ) Notice: Subject to any disclaimer, the term of this patent is extended or adjusted under 35 U.S.C. 154(b) by 0 days.

(21) Appl. No.: 09/416,565

(22) Filed: Oct. 12, 1999

(51) Int. Cl.[7] .................................................. G01J 5/02
(52) U.S. Cl. ............................ 280/339.04; 250/339.01
(58) Field of Search ....................... 250/339.54, 339.01, 250/338.01, 336.01

(56) References Cited

U.S. PATENT DOCUMENTS

| | | |
|---|---|---|
| 2,844,032 A | 7/1958 | Tandler |
| 3,350,562 A | 10/1967 | Flint |
| 3,601,611 A | 8/1971 | Kendall |
| 3,641,345 A | 2/1972 | Coackley |
| 3,935,460 A | 1/1976 | Flint |
| 4,332,168 A | 6/1982 | Aberle |
| 4,394,575 A | 7/1983 | Nelson |
| 4,493,553 A | 1/1985 | Korb |
| 4,874,572 A | 10/1989 | Nelson |
| 5,281,815 A * | 1/1994 | Even-Tov .................... 250/339 |
| 5,526,676 A | 6/1996 | Solheim |

* cited by examiner

Primary Examiner—Hung Xuan Dang
(74) Attorney, Agent, or Firm—Patton Boggs LLP (57) ABSTRACT

An advance in a passive, remote sensing device for measurement of atmospheric temperature utilizes an actuated modulator for periodically alternating the radiation detected by a detector at a selected infrared wavelength between the infrared radiation from the atmosphere and that from the infrared reference radiation emitted from a reference material such that the detector compares the radiation emitted from the atmosphere to that emitted by the reference material at the selected infrared wavelength in order to determine the atmosphere temperature. Preferably, the modulator is a MEMS based modulator having a movable grating formed by MEMS based fabrication techniques.

38 Claims, 2 Drawing Sheets

METHOD AND APPARATUS FOR MEASURING ATMOSPHERIC TEMPERATURE

BACKGROUND OF THE INVENTION

1. Field of the Invention

The present invention relates to a method and apparatus for the measurement of atmospheric air temperature; and, more specifically, to passive, remote atmospheric air temperature sensing.

2. Description of the Related Art

Atmospheric air temperature sensing and measurements are critical to the performance and safety of aircraft. As performance requirements of modern aircraft increase, the need for more accurate air temperature sensing, with more resolution and higher data gathering rates, becomes more critical. The temperature of the air through which the aircraft is moving impacts its aerodynamics, engine performance, and the environmental control.

Air temperature is also important to flight safety. There are numerous atmospheric disturbances and flight hazards associated with different types of temperature conditions. These include microbursts, clear air turbulence, and icing. Therefore, more accurate and/or faster air temperature measurements, especially when detecting the air temperature ahead of modern aircraft, is important. Warning of temperature variations and clear air turbulence for supersonic aircraft, such as the proposed High Speed Civil Transport, is particularly critical. Temperature variations and clear air turbulence can cause, among other problems, a phenomenon known as "engine unstart," a momentarily loss of engine power. The air temperature must therefore be measured at some distance in front of the aircraft, thereby potentially providing a warning of clear air turbulence and temperature variations and allowing the engines to be adjusted to prevent the unstart occurrence. At supersonic speeds this is difficult.

Air temperature measurements must also be accurate enough to yield good thermal profiles at supersonic speeds which then can be used to timely detect rapid thermal anomalies indicative of clear air turbulence. However, this is difficult to do with traditional technology, such as a thermistor in the airstream, since the aereodynamic heating from the airflow heats the probe above the actual air temperature by a few degrees Celsius for low speed aircraft and up to hundreds of degrees for supersonic aircraft. Therefore, small variations in air craft velocity at supersonic speeds causes atmospheric temperatures measurements to vary greatly.

Beyond the data requirements of modern aircraft, there are also new configuration requirements which impact the fundamental measurement problem. An example is military aircraft having low radar profiles, known as stealth aircraft. This configuration requires that the temperature probe also have a low radar profile. The stealth requirement, thus, cannot be met by traditional physical probes which must extend out beyond the boundary layer, ahead of the aircraft, to sample air undisturbed by the aircraft.

In order to solve the problems associated with conventional immersion type thermometers which physically extend into the air, remote sensors have been developed. They are basically of two types: active and passive. Active systems send out, or emit, a signal that is then, for example, reflected to a detector. Optical systems, such as laser-based (lidar) systems are examples of active systems. These systems, however, suffer from many problems, two of which are particularly significant. First, because they are active, signal power requirements are substantial. Second, and most significantly, active systems are traceable by optical detection systems destroying the stealth aspect of their use.

Passive systems do not emit electromagnetic radiation signals, but register naturally occurring emissions from, for example, heated gas molecules. Since, the temperature of the air, as a gas, is related to the storage of energy by molecules in the gas, as the temperature increases, the radiation emitted by gas molecules also increases. Thus, for example, if one picks nitrogen, carbon dioxide or oxygen, which are three of the most prevalent gas molecules in air, and measures the increase and decrease of radiation by those molecules versus the directly measured temperature of a known reference body, a correlation can be established. By measuring the radiation with a passive detector proximate the aircraft's skin, one can then determine the temperature of the air through which the craft is passing.

"Radiometers" are passive instruments which measure the magnitude of radiation at various wavelengths by passive radiant gas thermometry. Broad spectrum radiometers are able to measure radiation over a number of wavelengths, while narrow spectrum radiometers focus on a very narrow range and maybe even a particular wavelength from a particular element or compound. Airborne, remote sensing radiometers, for the determination of atmospheric temperature from aircraft, hold great promise as the instrument of choice for highly accurate, high speed, stealth atmospheric temperature measurement.

Passive radiant gas thermometry holds several important advantages over conventional airborne thermometer techniques. Radiometry based air temperature measurement starts with the passive collection of radiated emissions from the atmosphere proximate the aircraft. The system can "see" beyond the thermal boundary layer and measure infrared radiation some distance in front of the aircraft. The intensity of this radiation is measured at selected wavelengths which are correlated with the absorption bands of particular gases in the atmosphere. For example, U.S. Pat. No. 4,394,575, issued to Nelson, describes a radiometer which measures infrared emissions from the atmosphere at 4.3 $\mu$m, which are centered on an absorption band of atmospheric carbon dioxide ($CO_2$). The measured intensity of the selected wavelengths of infrared radiation from the atmosphere is then calibrated against radiation emitted from a "blackbody" source having a known temperature and emissivity, in order to calculate the static air temperature. Here the static air temperature is taken to be the true air temperature undisturbed by the presence of any aircraft.

Radiometry based air temperature measurements have several proven advantages over conventional airborne thermometer techniques. First, passive remote sensing radiometers are not adversely affected by aerodynamic heating. Thus, no corrections for aircraft velocity, aircraft attitude (sideslip or yaw) or atmospheric pressure are required. In this manner radiometers provide a "direct" measurement of the air temperature. Second, radiometers are not affected by convective cooling resulting from sensor wetting. In hydrometeor clouds, conventional thermometers can erroneously read several degrees Celsius below the actual atmospheric temperature, due to the sensor probe becoming wet. Third, radiometers can accurately measure the static air temperature beyond the aircraft thermal boundary layer. Such layers can be very thick (several meters) for high speed aircraft, precluding the use of a conventional thermistor entirely. Radiometers are also not adversely affected by shock fronts associated with supersonic flight. Fourth, radiometers typically receive atmospheric thermal radiation through a small optical window normally mounted along the aircraft outer mold-line. An atmosphere-to-sensor interface conformal to the aircraft skin is advantageous to high-speed, high performance and low radar cross-section aircraft. Since the window is optically very transparent (low absorption), window heating from the surrounding skin and atmosphere does not adversely affect the radiometrically measured air temperature.

Radiometry based temperature measurement is ideally suited for high-speed, high-altitude aircraft. Fast and accurate air temperature information are used by these advanced aircraft for optimizing engine efficiency and calculating flight parameters, as well as for warning of approaching atmospheric conditions. Traditional temperature measurement technology, such as a thermistor that extends from the aircraft into the airstream, are inaccurate when the aerodynamic heating from the very rapid airflow warms the probe significantly above the actual air temperature. This is partially offset through pre-flight calibration by introducing a velocity dependent correction term and by use of sophisticated housings. Radiometry technology, unaffected by the aerodynamic heating at supersonic speeds, provides static air temperature information that is very difficult to obtain by traditional temperature measurement technology.

Passive radiometry-based air temperature measurement also has key advantages for military "stealth" aircraft. Stealthy aircraft are designed to have minimum radar cross-section and overall low observability. These include all forms of aircraft, from bombers to fighters to helicopters to unmanned air vehicles. Passive radiometers provide these aircraft with the temperature information they need to fly at optimum performance and are fully contained within the body of the aircraft. Their window can be conformal to the aircraft and coated to minimize its radar cross-section. No radiation is emitted from the radiometer, in contrast to laser radars (lidars). Optical countermeasures such as high peak power laser pulses cannot be used to defeat the radiometer. Passive radiometers only accept radiation in very narrow wavelength regions where the atmosphere is strongly absorbing and therefore are nontransmissive to lasers.

Air temperature measurements by radiometry have also an advantage over traditional methods because of their higher accuracy and shorter measurement time. Traditional probes have typical temperature accuracies of 1° C. Their measurement time is set by the probe's thermal inertia, which can be as long as one second or more. Radiometers have demonstrated accuracies of better than 0.1° C., even at shorter measurement times. Improved accuracy and as well as the rate at which the samples are taken can help improve estimates of aircraft performance and control. For example, higher accuracy temperature measurements contribute to higher accuracy Mach number measurements which are important to fuel efficiency calculations and in setting engine operating parameters. An example for flight control is that higher accuracy measurements of air temperature contribute to higher accuracy estimates of air density which is used by some flight control systems in the auto-pilot to give an altitude hold mode to alleviate pilot workload.

Although radiometers are the instruments of choice for atmospheric temperature determination, current systems suffer some significant operational draw backs. First, current radiometry technology is too bulky for widespread use in commercial and military aircraft. Current radiometers require a bulky, blackbody reference source to provide infrared reference radiation at a known temperature. This source is required as a reference with which the atmospheric radiation measurement is compared. The maintenance of this reference, at a constant temperature is critical to the accuracy of the measurement. The very bulky thermal insulation, required to maintain the source at a constant temperature, is difficult to miniaturize.

Second, flight hardware must be very reliable. A radiometer requires the infrared source to be switched between radiation from this blackbody source (the reference source) and the atmosphere (the sample source) at rather high frequencies to continually and rapidly make a comparison between the two. This is necessary to generate accurate calibrated air temperature measurements. The switching is typically accomplished by a chopper wheel modulator which allows the infrared radiation viewed by the detector to alternate between the radiation emitted from the outside air and the radiation emitted from the blackbody source. The chopper wheel must rotate at a high rate of speed to minimize the 1/f noise in the detection channel, as well as generate data continuously while the aircraft is moving at a high rate of speed. This places a tremendous amount of stress on the chopper wheel bearing assembly. In flight failure of the bearing causes failure of the system. Thus, expensive redundancy or heavy duty assemblies are required.

Third, prior art radiometers are energy inefficient, which generates heat that can cause the constant temperature of the blackbody reference source to fluctuate. The chopper motor used to rotate the wheel generates significant heat which interferes with the infrared radiation measurement from the source and the reference as well as causing temperature fluctuations in the constant temperature, reference source.

Finally, previous radiometers are subject to system noise interference. 1/f noise is common in optical detectors. It is minimized by modulating or switching the optical signal at a higher frequency and electronically filtering the detected signal at the same frequency. The lower the switching frequency the higher the noise. When this switching is accomplished by a mechanical chopper wheel, the alternation between the radiation emitted from the outside air and the radiation emitted from the ablackbody source, is at a lower, and therefore more noisy, frequency.

It would, therefore, be advantageous to have a passive, remote sensing radiometer for measurement of atmospheric air temperature that was small in size and had low power requirements; had increased the reliability of the in-flight radiometric instrumentation; would provide accurate, direct measurement of the true air temperature, but was not adversely affected by aircraft velocity, aircraft altitude, local pressure/altitude, or cloud wetting; was capable of measuring beyond the aircraft boundary layer and supersonic shock fronts; had fast response measurement which is not limited by the thermal mass of a temperature probe and housing; and, provided multi-wavelength capability for developing range-resolved thermal profiles for application to detecting and warning of engine unstart and clear air turbulence while minimizing sources of noise in the system which limit performance, including the detector 1/f noise and the thermal radiance from the walls. In addition, it would be advantageous to have such a system which was less bulky, more energy efficient and had accuracy at greater speeds and higher altitudes.

SUMMARY OF THE INVENTION

A passive, remote sensing device for measurement of atmospheric air temperature that is capable of measuring beyond the aircraft boundary layer and supersonic shock fronts; has fast response, with measurements not limited by the thermal mass of a temperature probe and housing; and provides accurate, direct measurement of the true air temperature, but is not adversely affected by aircraft velocity, aircraft altitude, local pressure/altitude, or cloud wetting has been discovered. The inventive device is small in size while minimizing sources of noise in the system, has low power requirements and increased reliability, as well as providing multiwavelength capability for developing range-resolved thermal profiles for application in detecting and warning of engine unstart and clear air turbulence.

According to the invention, a passive, remote sensing device for measurement of atmospheric air temperature, which is less bulky and has accuracy at greater speeds and higher altitudes and can make in-flight passive spectroscopic measurements of air temperature at select distances beyond an aircraft thermal boundary layer, uses an actuated movable grating modulator for switching the detected infrared radiation between the atmosphere and a reference source. The actuated, movable grating modulator, which is preferably electrostatically actuated, is more energy efficient and more reliable than a conventional chopper wheel. The device of the present invention includes microelectronic machine based parts that are less than $\frac{1}{1000}$ the size of comparable macro-sized parts and allows the miniaturization of the device such that the entirety of the device can be maintained at constant temperature, eliminating bulkiness. Optical filter selection can be adjusted to provide a very localized temperature measurement or a longer-path measurement (such as ahead of the aircraft). The device is able to both measure radiation over a number of wavelengths, as well as a narrow spectrum focused on a very narrow range including a particular wavelength.

According to the broad aspect, a device for passive, remote sensing of air temperature employs an actuated modulator for periodically alternating the radiation for detection by an infrared radiation detector between the infrared radiation emitted from the atmosphere and that emitted from an infrared reference radiation source such that the radiation emitted from the atmosphere is compared to that emitted by the reference source at a given infrared wavelength in order to determine the air temperature. In one aspect, a device for passive, remote sensing of air temperature which has a window for allowing infrared radiation to pass from the atmosphere into the device and onto a detector which measures radiation intensity at a selected infrared wavelength; and a temperature reference material that provides infrared reference radiation from a surface of known emissivity and temperature comprises an actuated modulator for periodically alternating the source of radiation for detection by an infrared radiation detector between the infrared radiation emitted from the atmosphere and that emitted from the infrared reference radiation source such that the radiation emitted from the atmosphere is compared to that emitted by the reference source at a given infrared wavelength in order to determine the air temperature.

The modulator of the present invention can be electrostatically, thermally, or piezoelectrically actuated. Preferably, the modulator comprises an electrostatically actuated, vertically movable grating positioned proximate a fixed base, wherein the vertical position of the movable grating with respect to the fixed base is adjusted by applying an electric potential (voltage) between the movable grating and the base. A vertically moving grating includes an electrostatically movable first grating spaced above a fixed second grating. The gap between the gratings can be adjusted from a wide position to a narrow position by applying a preset electric potential across the gratings. In one preferred aspect, when the gratings are in the wide gap position, the interference between light reflected from the first and second gratings is entirely constructive, and almost all the light is reflected off the pair of gratings as $0^{th}$ order diffracted light. In contrast, when the gratings are in the narrow gap position, the interference between light reflected from the top and bottom gratings is destructive, the $0^{th}$ order reflection drops to almost zero intensity, and most of the light energy is transferred into $1^{st}$ order satellite bands.

In accordance with the invention, $0^{th}$ order light and $1^{st}$ order light are diffracted in different directions by the modulator. Thus, if the modulator and detector are aligned such that the $0^{th}$ order light hits the detector, then the $1^{st}$ order light will be diffracted away from the detector.

In a preferred aspect of the present invention, this phenomenon of diffracted light is exploited by aligning the modulator such that the detector alternates between receiving $0^{th}$ order light from atmospheric thermal emissions and $1^{st}$ order light from the temperature reference material.

According to the invention, a wide range of prior art modulators or "switches" can be used in the system. These include thermal or electrostatic actuators. Examples of these modulators include: variable blaze gratings, variable transmissive gratings, micro-chopper wheels, micro-shutters, reflective or transmissive Fabry-Perot devices, and movable mirrors. The preferred embodiment has the advantages of being electrostatically driven, producing large angular displacements between the reference and main signal beams, being simple in construction, working over a broad range of wavelengths, producing the necessary modulation frequencies, and requiring only low operating voltages.

The window or opening for allowing radiation from the atmosphere to pass into the device is made from any suitable material designed for such use that is transparent to the wavelength of radiation that is to be measured by the device. Such materials that can be formed into the mold line of an aircraft are greatly preferred. The window can include a solar blind optical filter which passes select portions of the infrared spectrum and blocks wavelengths in the visible spectrum. In another aspect, the window is coated with a hard material such as a diamond-like-carbon in order to retard scratching or abrasion. In this preferred aspect, the window that allows thermal radiation from the air to enter the radiometer and the temperature reference material are arranged such that the window is in the path of the $0^{th}$ order radiation diffracted by the modulator, and the temperature reference material is in the path of $1^{st}$ order radiation. In other words, the detector alternately views images of the window and the temperature reference material which are diffracted off of the modulator. The modulator permits the radiometer to alternate between measurements of infrared radiation emitted by the atmosphere and infrared radiation emitted by the reference material at frequencies exceeding 500 Hz. This high frequency sampling provides fast, statistically averaged air temperature information, and virtually eliminates the 1/f noise in the sample and reference signals.

The temperature reference material can comprise any conventional black-body calibration source. For example, conventional blackbody sources made by Epply Laboratory, Inc., such as the Eplab Model BB25TB, are adequate conventional sources for the present invention. In one aspect, the bulky, blackbody reference source is replaced with a thin layer of temperature reference material that can be coated onto a wall of the radiometer.

The temperature of the temperature reference material is preferably measured with a temperature measurement means. In a preferred aspect, the temperature measurement means comprises a resistance temperature detector. However, a thermocouple, thermistor, or similar temperature transducer can be used.

The device of the present invention is preferably kept at a constant temperature with a temperature control means. Preferably, the temperature control means is selected from the group consisting of a thermoelectric cooler, a Dewar, and a cryo-cooler. In one embodiment, the temperature control means is a thermoelectric cooler which can for example, maintain the radiometer at a constant temperature between about 160 K and about 293 K. In another embodiment, the temperature control means is a liquid nitrogen cooler, which can maintain the radiometer at a constant 77 K. In another embodiment, the temperature control means is a liquid filled Dewar. In another preferred aspect of the present invention, focusing means are used to focus the filtered light from the atmosphere onto the modulator.

Focusing means can also be used to focus the light emitted by the temperature reference material onto the modulator, and the light diffracted by the modulator onto the detector. The focusing means preferably comprise lens optics that are coated with anti-reflection coatings to maximize light transmission through the optics, and minimize scattered light. Reflective, diffractive or a combination (hybrid) optic focusing means, well known in the art, can also be used for focusing.

The wavelength filtering means of the present invention can be dispersive or non-dispersive. Preferred filtering means include interference filters, gas correlation filters, and continuously adjustable wavelength selective filtering means. The adjustable wavelength selective filters can include wavelength selective elements like diffraction gratings, prisms, and etalons. In a preferred aspect of the present invention the filtering means comprises a Fabry-Perot filter which can continuously scan across a wide wavelength range, while maintaining a very narrow bandwidth around the central wavelength of interest.

The detector of the present invention is preferably selected from the group of detectors consisting of HgCdTe detectors, PbSe detectors, PbS detectors, Si detectors, Ge detectors, pyroelectric detectors, Golay Cells, and InAs detectors. Quantum Well Infrared Photodetectors (QWIPs detectors) and microbolometers are also contemplated as light detector technologies that can be used to make the detector for the present invention.

A method of determining airborne air temperature measurements with a remote, passive device is also disclosed. In accordance with this method invention, remote, passive device measures the intensity of light from the atmosphere at select wavelengths, preferably wavelengths between 1 $\mu$m and 20 $\mu$m where the blackbody emission spectrum peaks for typical atmospheric temperatures, and more preferably at 4.3 $\mu$m or 15 $\mu$m which are carbon dioxide absorption bands, and compares the measured intensity of this light with light intensity from a temperature reference material at a known temperature, in order to find the temperature of the atmosphere by alternating between measurements of radiation intensity of the atmosphere, and the temperature reference material using an actuated movable grating modulator.

In another preferred aspect of the method of the present invention, a tunable wavelength filtering means (e.g., a Fabry-Perot filter) is used to map air temperature for a volume of air surrounding an aircraft. This method involves scanning the wavelength of the atmospheric thermal radiance around a center wavelength that is associated with an absorption band for an atmospheric gas. When the radiometer bandpass is centered on the absorption band, the only radiance which reaches the detector is that which came from a short range in front of the instrument, because radiance from further out has been absorbed by the intervening gas. Conversely, when the bandpass is to the side of the absorption band center, the nearby gas is less effective as an absorber and radiance from longer distances will be detected. The radiometer essentially performs an exponential average over a range determined by the absorption coefficient of the gas at a given wavelength. By operating at multiple wavelengths, each averaging over a progressively longer range, it is possible to determine the radiance, and hence the temperature, as a function of distance in front of the radiometer. The choice of a set of center wavelengths and bandwidths help to define a set of "weighting functions" used in an iterative process to convert the measurements of radiance into temperature profiles.

In an alternate preferred embodiment of this method, multiple discrete spectral bands can be investigated without the need for a scanning wavelength filter. As with the scanning implementation, spectral bands are selected to provide temperature measurements at distinct range bins from the instrument. Such spectral bands can be selected by numerous optical configurations. These include multiple detectors used in conjunction with dispersive optical elements, like diffraction gratings and prisms; multiple detectors used in conjunction with multiple interference filters; multiple detectors used in conjunction with tunable dispersive optical elements like diffraction gratings and prisms; sandwiched detectors used in conjunction with tunable dispersive optical elements like diffraction gratings and prisms; and singular detectors used in conjunction with tunable dispersive optical elements like diffraction gratings and prisms.

In an alternate preferred embodiment of this method, the air temperature can be mapped with a non-scanning wavelength filter (e.g., an interference filter) by vertically scanning the field of view of the radiometer. Algorithms allow a temperature versus altitude profile to be derived.

The preferred radiometer of the present invention comprises: a window for allowing radiation from the air to pass into the radiometer; a temperature reference material that emits radiation with an intensity and spectrum determined by Plancks law; a wavelength filtering means for allowing only selected wavelengths of infrared radiation from the atmosphere and the temperature reference material to impinge on a detector which measures radiation intensity; an electrostatically actuated movable grating modulator for periodically alternating radiation measured by the detector between the radiation from the air and the well defined reference radiation from the temperature reference material, wherein the modulator comprises an electrostatically actuated vertically movable grating positioned above a fixed base, and the vertical position of the movable grating with respect to the fixed base is adjusted by applying a voltage between the movable grating and the base.

Alternatively, a preferred aspect of the present invention replaces a conventional black-body source with a thin layer of reference material that is attached to a surface at the radiometer. In this preferred aspect, reference materials include Martin Black, Enhanced Martin Black, Cat-A-Lac paint, dendritic platinum, and materials formed by anodizing a surface in the radiometer. Any such coating with a known emissivity at the operating wavelength(s) could be used. However ones with emissivity near 1 are preferred.

As a means of enhancing the radiometer's calibration and accuracy and as a means of assessing the proper function of the radiometer, thermal emission from the detector can be re-directed back toward, and collected by, the detector itself. Since the detector temperature is controlled and stabilized, re-collecting the detector's thermal emission provides a means of calibrating the radiometers electronic output to a known temperature.

This method can be used with and without the said blackbody calibration source. When this method is used in conjunction with the blackbody calibration source, both the final electronic gain and the electronic offset can be determined, improving system accuracy with an improved calibration methodology. Alternately, the detectors thermal emission can be used to entirely replace the blackbody calibration source. Finally, collecting the detector's thermal emission provides information on the functionality of various electronic subsystems. Such information can be used to determine the health status of these subsystems. There are different ways to allow the detector to view its own radiance. The preferred method is to mount a mirror or corner cube reflector to the wall and have the modulator alternate the viewing direction of the detector from the air, to the reference material, to the mirror.

The thermal characteristics of the section of the wall which acts as the reference is important because it serves to calibrate the air temperature measurements. The thermal characteristics of the sections of the wall not making up the reference are also important because their thermal emission can scatter off of the optics into the detector giving a background radiation above which the signal must be detected. If this radiation is not stable then it causes systematic errors in the air temperature measurement. Depending on the exact configuration, these sections of the walls can be coated with low emissivity materials (like gold) or high emissivity materials like blackbody coatings. More exotic materials like photonic bandgap materials which could virtually eliminate thermal emission at the operating wavelengths of the radiometer could also be used.

In another preferred aspect of the present invention, focusing means are used to focus the filtered radiation from the atmosphere onto the modulator. Focusing means can also be used to focus the radiation emitted by the temperature reference material onto the modulator, and the radiation diffracted by the modulator onto the detector. The focusing means preferably comprise lens optics that are coated with anti-reflection coatings to maximize radiation transmission through the optics, and minimize scattered radiation.

All or part of the radiometer of the present invention is preferably kept at a constant temperature with a temperature control means. In one preferred aspect, the temperature control means is a thermoelectric cooler which can maintain the key radiometer components at a constant temperature between about 160 K and about 293 K. In another preferred aspect, the MEMS radiometer is contained within the detectors cryo-cooler or a cryogenic liquid filled Dewar which maintains the radiometer at a constant temperature near 77 K. In another preferred aspect, a thermoelectric cooler is used to cool the radiometer, but an electronic control loop is used to keep the radiometer temperature the same as the measured external temperature in order to reduce aspects of the electronic noise. A Dewar can be used to maintain temperature below ambient air tempeture.

The radiometer of the present invention can also be made from microelectromechanical system (MEMS) based components. In this preferred aspect, radiometry components including optics, windows, wavelength filtering means, and the electrostatically actuated movable grating modulator are micro-machined to sizes ranging from 1–1000 microns, using techniques originally developed in the semiconductor chip fabrication industry. In another preferred aspect, the MEMS based radiometer is built on a single silicon wafer chip. The small size of a MEMS radiometer increases the ability to control the radiometers temperature and therefore reduces the effect of stray radiance on the temperature measurement.

The MEMS based radiometers, built with batch processing techniques, are significantly less costly than macro-sized radiometers. Moreover, these radiometers require significantly less power than macro-sized radiometers, making MEMS-based radiometers much more practical for airborne air temperature measurements.

BRIEF DESCRIPTION OF THE DRAWINGS

The objects, features and advantages of the present invention will be apparent to one skilled in the art, in view of the following detailed description in which.

DETAILED DESCRIPTION OF THE INVENTION

Figure 1:
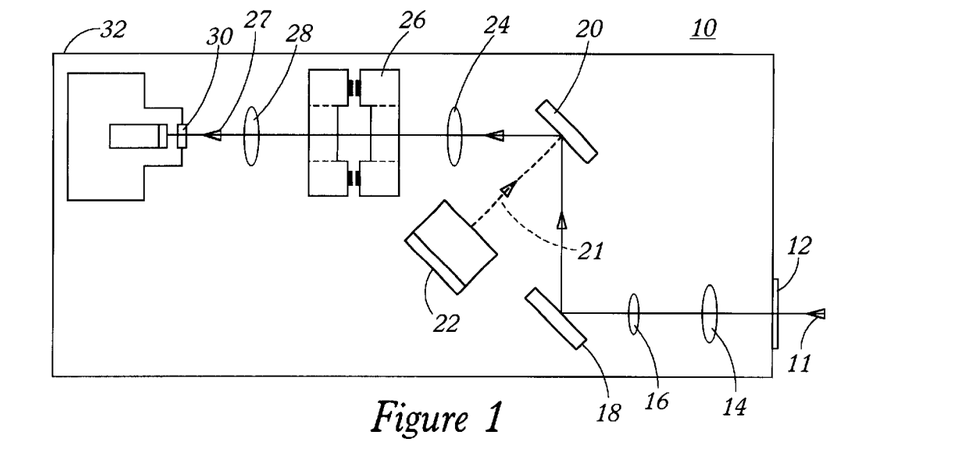
FIG. 1 represents a schematic representation of a preferred radiometer configuration having a Fabry-Perot optical filter.

Referring now to FIG. 1, a preferred radiometer of the present invention is shown. In this preferred radiometer 10, a measurement of the intensity of atmospheric radiation 11 at selected infrared wavelengths starts with passing the atmospheric radiation 11 through a window 12, which is mounted in the radiometer housing 32. The housing 32 of the radiometer 10 is sealed such that the atmospheric radiation 11 that enters the housing 32 passes through the window 12. In a preferred aspect of the invention, the window 12 incorporates a solar blind filter that is transparent for large portions of the infrared spectrum, but blocks most wavelengths in the visible spectrum.

Once the atmospheric radiation 11 passes through window 12 and into the radiometer 10, it is focused down onto a steering mirror 18 through a pair of telescoping optics, 14 and 16. In a preferred aspect of the invention, the steering mirror 18 is a miniaturized, MEMS based mirror. This mirror can be used to either scan the field of view of the radiometer 10 or, with input from a separate sensor, stabilize the viewing direction. After the demagnified atmospheric radiation 11 is reflected off of the steering mirror 18, it impinges upon the modulator 20, which alternates the radiation 11 being steered towards the detector 30 between atmospheric radiation 11, and reference radiation 21 generated by a temperature reference material 22.

The modulator 20 comprises an electrostatically actuated, vertically movable grating positioned above a fixed base. (See FIG. 3 for a detailed illustration of the modulator 20). When the vertically movable grating is positioned such that atmospheric radiation 11 diffracted off the grating, and off the base, are in phase (i.e., constructively interfering), then the modulator 20 acts as a mirror that directs the diffracted $0^{th}$-order atmospheric radiation 11 towards the Fabry-Perot optical filter 26 and the detector 30. When the grating is positioned such that the atmospheric radiation 11 diffracted off the grating and the base are phase shifted by 180° (i.e., destructively interfering), then the modulator 20 transfers the atmospheric radiation 11, into $1^{st}$ order satellite bands that are directed away from the Fabry-Perot optical filter 26 and detector 30. Meanwhile, this position of the modulator 20 directs the $1^{st}$ order diffracted reference radiation 21 from the temperature reference material 22 towards the Fabry-Perot optical filter 26 and detector 30. Thus, the modulator 20 alternates the radiation measured by the detector 30 between $0^{th}$ order diffracted atmospheric radiation 11 and $1^{st}$ order diffracted reference radiation 21, by changing the gap between the movable grating and the fixed base of the modulator 20. In a preferred aspect, the modulator 20 alternates the radiation measured by the detector 30, preferably at a rate of at least 500 Hz.

Before either the atmospheric radiation 11 or reference radiation 21 are measured by the detector 30, they are focused through a wavelength filtering means with a first focusing lens 24. The wavelength filtering means permits only a well defined wavelength band to reach the detector 30. In this preferred aspect, the wavelength filtering means is a tunable, Fabry-Perot optical filter 26 which can continuously scan across a wide wavelength range in the infrared, while maintaining a very narrow bandwidth around the central wavelength.

The filtered radiation is then further focused with a second focusing lens 28 onto a detector 30. In this preferred aspect, the detector 30 is a HgCdTe detector that converts photons from the filtered radiation into an electrical signal that can be captured and analyzed by data acquisition instrumentation (not shown) in electronic communication with the detector 30. This includes a pre-amplifier, synchronous demodulator, analog-to-digital converter, and a microprocessor which converts the signals from the detector and RTD into a calibrated air temperature measurement. These electronics might be produced using CMOS technology which is compatible with MEMs technology. Other electronic components which could be utilized include application specific integrated circuits, field programmable arrays, and digital signal processors.

The preferred embodiment shown in FIG. 1 can be constructed completely from MEMs components, for example, by using "Flip-Chip" techniques. Complete miniaturization of the system, including the electronics, would not only dramatically reduce weight and size, but could also enhance performance, for example, by allowing better temperature control of the system (see below).

Figure 2:
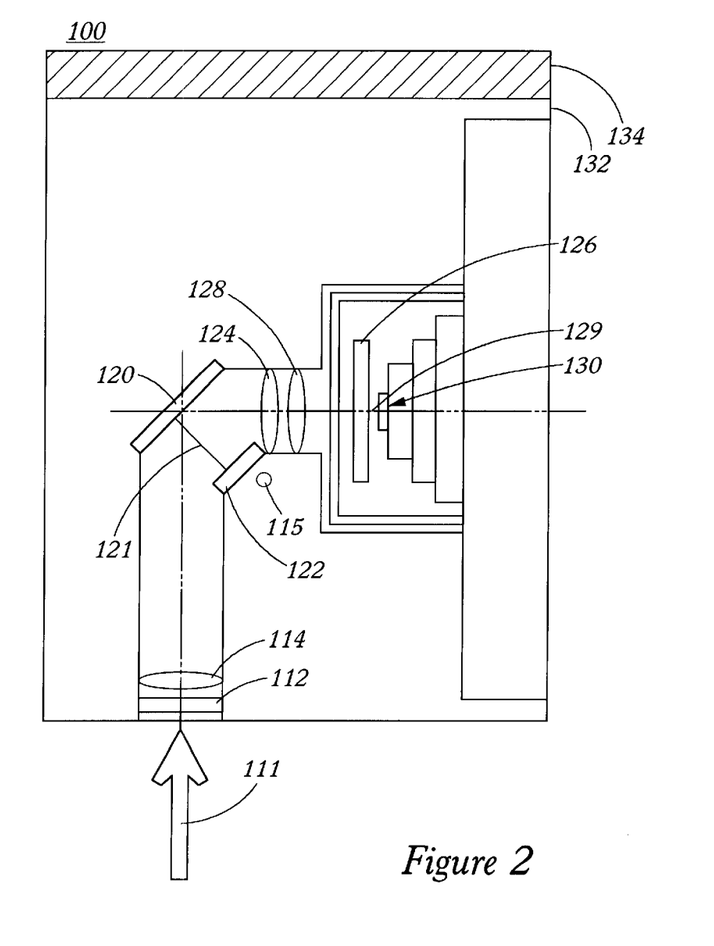
FIG. 2 represents a schematic representation of a preferred radiometer having an interference filter.

Referring now to FIG. 2, another preferred radiometer 100 of the present invention is shown. In this embodiment traditional and MEMs components are used together to form the radiometer. In this preferred radiometer, atmospheric radiation 111 emitted by thermal radiance from the atmosphere enters the radiometer 100 through a window 112. The housing 132 of the radiometer is hermetically sealed to prevent dust particles and water vapor from entering the radiometer 100. The housing 132 also prevents atmospheric radiation 111 from entering the radiometer 100, except for radiation that passes through the window 112. In a preferred aspect of the invention, the window 112 includes a solar blind filter that is transparent for large portions of the infrared spectrum, but blocks most wavelengths in the visible spectrum.

The atmospheric radiation 111, passing through the window 112 into the radiometer 100, is focused down onto the modulator 120 with the focusing lens 114. The modulator 120 is aligned with respect to the window 112 and the temperature reference material 122 such that $0^{th}$ order atmospheric radiation 111, and $1^{th}$ order reference radiation 121, are diffracted onto the detector 130.

The temperature reference material 122 preferably comprises a thin layer of material attached to an inside wall of the radiometer 100. The thin layer is preferably made from materials, including Martin Black, Enhanced Martin Black, Cat-A-Lac paint, dendritic platinum, and materials formed by anodizing a surface in the radiometer 100. A precise and accurate temperature is measured by a thermometer 115 for the temperature reference material 122, each time the detector 130 measures the intensity of the reference radiation 121 emitted by the material. The thermometer 115 is preferably a resistance temperature detector.

In this preferred embodiment of the radiometer 100, $0^{th}$ order atmospheric radiation 111 and $1^{st}$ order reference radiation 121 are focused down with focusing lenses 114, 124, 128 onto an interference filter 126, which filters the radiation measured by the detector 130 to a single wavelength. The detector 130 is a HgCdTe detector that converts photons from the filtered radiation 129 into an electrical signal that can be captured and analyzed by data acquisition instrumentation (not shown) which is in electronic communication with the detector 130. In a preferred aspect of this embodiment, the interference filter 126 filters all wavelengths except for one centered at about 15 μm. In another preferred aspect, the interference filter 126 only passes radiation having a wavelength of about 4.3 μm to the detector 130.

The detector 130, is preferably a HgCdTe detector that is cooled approximately to 77 K by a cryo-cooler. The cryo-cooler keeps the HgCdTe detector at a reasonable temperature to minimize the background noise in the detector. The radiometer housing 132 is also preferably cooled with a thermoelectric cooler 132. The thermoelectric cooler 134 maintains the radiometer housing 132, and all the radiometer 100 components inside the housing 132, at a constant temperature, thereby reducing the background noise from thermal radiation that is emitted by the radiometer 100.

Figure 3:
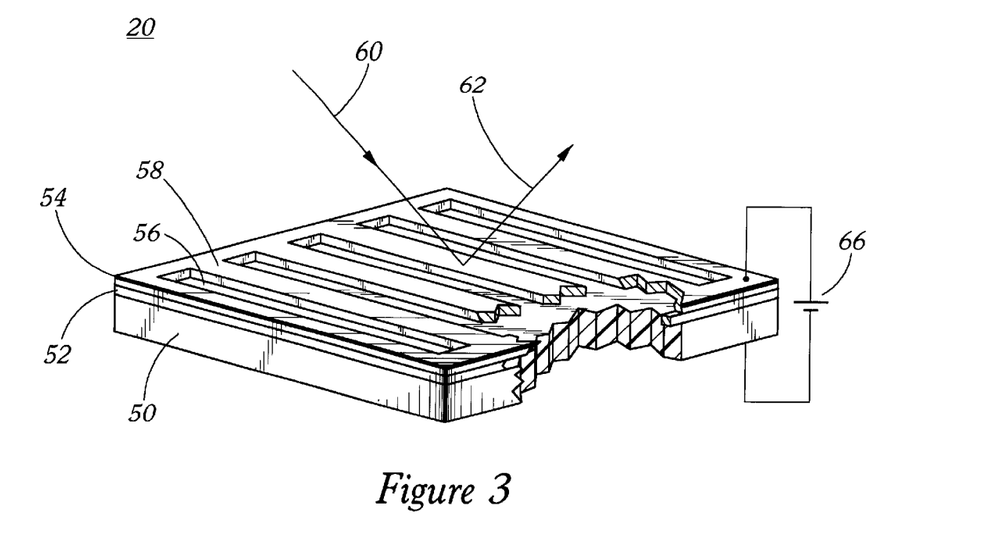
FIG. 3 represents a perspective illustration of a preferred electrostatically actuated movable grating modulator in a wide gap position.

Referring now to FIG. 3, a preferred electrostatically actuated, movable grating modulator 20 is shown, where the gap between movable grating 54 and stationary base 50 is in the wide position. In this preferred aspect, the wide position represents a spacing between the movable grating 54 and the base 50 where radiation diffracted from the surfaces of the grating 54 and base 50 constructively interfere with each other. As a result, the modulator 20 acts like a mirror, and almost all the radiation 60 impinging on the modulator is reflected as $0^{th}$ order diffracted radiation 62.

The gap between the movable grating 54 and the base 50 is maintained by a pair of ridges 52 formed on opposing ends of the reflective side of the base 50. The movable grating 54 lies flat on the ridges 52, thereby maintaining a constant distance between the movable grating 54 and the base 50, at all points across the flat surface of the base 50. The modulator 20 will maintain this shape until a voltage is applied that creates an electrostatic attraction between the grating 54 and the base 50. (See FIG. 4).

In a preferred aspect of the present invention, the modulator 20 is a MEMS based modulator, and the movable grating 54 is formed by MEMS based fabrication techniques. Thus, the movable grating 54 is formed. from a micron thin layer of a photoetchable material, such as silicon nitride or polysilicon, which is etched to form periodic apertures 56 across the layer. The remaining, non-etched portion of the layer is then coated with a deposited reflective material, such as gold, to form reflective grating 54 beams 58 between the apertures 56 in the movable grating 54. The top surface of the base 50, which faces the movable grating 54, is also coated with the reflective material, and the base 50 itself is made substantially from silicon. In another preferred aspect of the modulator 20, the base 50 is a grating, instead of a solid reflective surface (not shown).

Figure 4:
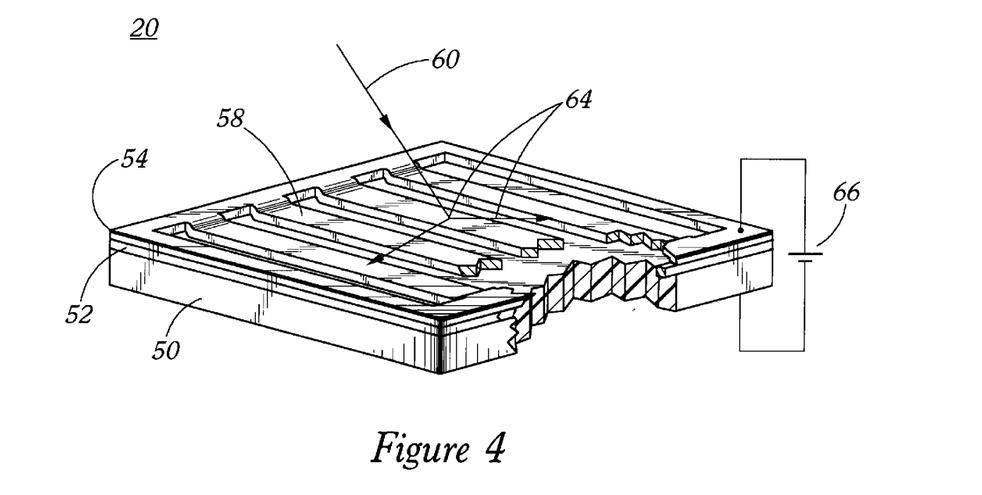
FIG. 4 represents the electrostatically actuated, movable grating modulator in a narrow gap position.

Referring now to FIG. 4, the preferred, electrostatically actuated movable grating modulator 20 in FIG. 3, is now shown with a voltage 66 applied across the movable grating 54 and base 50. The applied voltage 66 creates an electrostatic charge imbalance between the top and bottom grating which causes the grating beams 58 to move closer to the stationary base 50. When the gap between the base 50 and the beams 58 of movable grating 54 reaches the "narrow" position, the radiation reflected by the grating 54 and base 50 destructively interfere, and almost all the $0^{th}$ order incident radiation 60 is transferred into $1^{st}$ order satellite bands which send the diffracted $1^{st}$ order radiation 64 in a direction that is approximately perpendicular to the direction of the $0^{th}$ order diffracted radiation 62 in FIG. 3. The grating beams 58 remain in their narrow gap position with respect to the base 50 for as long as the voltage 66 is applied. When the voltage 66 is removed, the resilient grating beams 58 will return to their wide gap position as shown in FIG. 3.

The resilient grating beams 58 can move up to thousands of time per second between the wide gap and narrow gap positions without damage or fatigue. Switching the gap position allows the radiometer detector alternately to measure the radiation intensity of select infrared wavelengths from the air and from a temperature reference material at frequencies of 1000 Hz or higher.

It will be realized by the skilled artisan that the devices of the instant invention are not limited to one molecular absorption band, or even the absorption band for a single molecule. For example, air temperature measurements using both the 4.3 $\mu$m and 15 $\mu$m bands for carbon dioxide might help eliminate systematic errors due to water and ice and other interferences. The present invention, because of its small size and efficiency, could act as a building block for a system to measure air temperature which used very different wavelengths and different gases. In principle, this could function at all wavelengths from millimeter waves and shorter, with the requirement being that the wavelength of the thermal emission detected must be appreciably smaller than the diameter of the input aperture and optics used for the device. Different detectors and materials would have to be used depending on the exact wavelengths.

Further the device of the instant invention is so accurate that it can be used to detect very small amounts of certain gases in the atmosphere. If atmospheric gases are at a different temperature than the background, then radiometers can be used to detect the presence of the gas by measuring this temperature differential. This means that a passive system can be used to detect the presence of trace gases in the air. To do this requires that the gas be of sufficient concentration, that it has sufficiently strong absorption bands, and that there is sufficient temperature contrast between the gas and its background. One commonly used background scene is the sun. The present invention could be used in making such a trace gas detection system.

The device of the present invention has been exemplified with reference to the various aspects and examples described and illustrated above. By using the description of the present invention found herein, one skilled in the art may be able to design other versions of the radiometer which differ from those illustrated. However, the present invention is not intended to be limited to only the described aspects and examples. Rather, the following claims, and all equivalents of these claims, define the scope of the present invention.

What is claimed is:

1. A device for passive, remote sensing of air temperature having a window for allowing radiation to pass from the atmosphere into the device and onto a detector which measures radiation intensity at selected wavelengths; and a temperature reference material that provides reference radiation from a known surface at a known temperature at said selected wavelengths comprising:
   an actuated modulator for periodically alternating the radiation detected by the detector between the radiation from the atmosphere and that from the reference radiation emitted from the reference material such that the detector compares the radiation emitted from the atmosphere to that emitted by the reference material at said selected wavelengths in order to determine the air temperature.

2. A device for passive, remote sensing of air temperature comprising:
   a window to receive radiation from the atmosphere;
   a detector to measure radiation intensity at selected wavelengths;
   a temperature reference material to provide reference radiation at a known temperature; and
   an actuated modulator to alternate the radiation to be measured by the detector between the radiation from the atmosphere and the reference radiation from the reference material,
   wherein the detector compares, at said selected wavelengths, the radiation from the atmosphere to the reference radiation from the reference material to determine the air temperature.

3. The device of claim 1, wherein said modulator is electrostatically, thermally, or piezoelectrically actuated.

4. The device of claim 1, wherein said selected wavelengths are selected from 4.3 $\mu$m and 15 $\mu$m.

5. The device of claim 1, wherein said modulator comprises a MEMs manufactured electrostatically actuated modulator such as a phase grating, variable blaze grating, transmissive grating, or micro-shutter.

6. The device of claim 1, wherein said selected wavelengths are selected from a group of multi-wavelengths capable of developing range-resolved thermal profiles for application in detecting and warning of engine unstart and clear air turbulence.

7. The device of claim 1, wherein said modulator comprises a MEMS manufactured electrostatically actuated vertically movable grating positioned above a fixed base, and the vertical position of the movable grating with respect to the fixed base is adjusted by applying a potential between the movable grating and the fixed base.

8. The device of claim 1, wherein said modulator periodically alternates the radiation measured by the detector at a modulation alternation rate grater than 500 Hz.

9. The device of claim 1, wherein said device further comprises a temperature control means for maintaining the device components at a constant temperature.

10. The device of claim 9, wherein said temperature control means is selected from the group consisting of a thermoelectric cooler, a Dewar and a cryo-cooler.

11. The device of claim 10, wherein said temperature control is achieved by enclosing the device components inside said temperature control means.

12. The device of claim 1, wherein said selected wavelength is selected from a range of wavelengths from 1 µm to 20 µm.

13. The device of claim 1, wherein said selected wavelengths are selected from the group of wavelengths representing emission from the carbon dioxide bands.

14. The device of claim 1, wherein said window includes a solar blind filter.

15. The device of claim 1, wherein said temperature reference material is selected from the group consisting of Enhanced Martin Black, Cat-A-Lac paint, dendritic platinum, materials formed by surface anodization, and high emissivity paints.

16. The device of claim 1, wherein said wavelength filtering means comprises an interference filter.

17. The device of claim 1, wherein said wavelength filtering means comprises a tunable Fabry-Perot optical filter.

18. The device of claim 1, wherein said wavelength filtering means include dispersive optical elements and or multiple detectors.

19. The device of claim 1, wherein the detector comprises an infrared radiation intensity detector selected from the group consisting of HgCdTe detectors, PbSe detectors, PbS detectors, Si detectors, Ge detectors, pyroelectric detectors, Golay Cells, InAs detectors, QWIPs detectors, and microbolometers.

20. The device of claim 1, wherein said device further comprises optics for concentrating the infrared radiation from the atmosphere which passes into the device through the window.

21. The device of claim 1, wherein said device includes MEMS components or is entirely manufactured as a MEMS device.

22. A device for making atmospheric temperature measurements comprising:
a solar blind window to receive infrared radiation from the atmosphere;
a thermal reference material to provide infrared reference radiation at a known temperature;
an interference filter to pass on infrared radiation at selected wavelengths;
a detector to measure radiation intensity of the infrared radiation received from the interference filter; and
an actuated modulator to alternate the radiation to be measured by the detector between the infrared radiation from the atmosphere and the infrared reference radiation from the reference material,
wherein the detector compares, at said selected wavelengths, the radiation intensity from the atmosphere and the radiation intensity from the reference material to determine the atmospheric temperature, and
wherein the actuated modulator includes at least one of electrostatiscally, thermally, and piezoelectrically modulator.

23. A method of measuring atmospheric temperature comprising:
receiving radiation emitted from the atmosphere and radiation emitted from a temperature reference material;
alternating, using a modulator, between the radiation emitted from the atmosphere and the radiation emitted from the temperature reference material; and
detecting, using a detector, the radiation alternated using the modulator to measure the atmospheric temperature.

24. The method of claim 23, wherein said radiation is selected from infrared and shorter wavelengths.

25. The method of claim 23, wherein said modulator is electrostatically, thermally, or piezoelectrically actuated.

26. The method of claim 25, wherein said modulator comprises an electrostatically actuated vertically movable grating positioned above a fixed base, wherein the vertical position of the movable grating with respect to the fixed base is adjusted by applying a potential between the movable grating and the base.

27. The method of claim 23, wherein said selected wavelengths are selected from 4.3 µm and 15 µm.

28. The method of claim 23, wherein said modulator comprises a MEMs manufactured electrostatically actuated modulator such as a phase grating, variable blaze grating, transmissive grating, or micro-shutter.

29. The method of claim 23, wherein said radiation detected by a detector alternates, between radiation emitted by thermal radiance from the atmosphere and radiation emitted by a temperature reference material, at a rate of at least 500 Hz.

30. The method of claim 23, wherein said method further comprises the step of filtering said radiation emitted by thermal radiance from the atmosphere and said light emitted by a temperature reference material, before they are detected by the detector, with a wavelength filtering means in order to set the path length over which the atmospheric temperature is measured.

31. The method of claim 23, wherein said method further comprises the step of using a scanning infrared filter and a single detector or dispersive optics and multiple detectors to measure the atmosphere temperature over multiple ranges in order to produce a range-resolved temperature profile.

32. The method of claim 23, wherein said method further comprises the step of cooling the device components with a temperature control means selected from the group consisting of a thermoelectric cooler, a Dewar and a cryo-cooler.

33. The method of claim 32, wherein the temperature control means of the device monitors the temperature.

34. The method of claim 32 wherein the temperature of the device components are controlled so that said components are kept at the same temperature as that of the outside atmosphere.

35. The method of claim 23 wherein said temperature reference material is the infrared detector itself.

36. The method of claim 23 wherein said method further comprises the step of collecting infrared emission from the detector surface to improve system calibration and accuracy and monitor operating parameters.

37. The method of claim 23 wherein said method further comprises the step of scanning the device field of view.

38. The method of claim 23 wherein said method further comprises the step of detecting very small amounts of certain gases in the atmosphere wherein said atmospheric gases are at a different temperature than the atmospheric background.

* * * * *